United States Patent
Wyatt et al.

(10) Patent No.: US 7,171,594 B2
(45) Date of Patent: Jan. 30, 2007

(54) PAUSING A TRANSFER OF DATA

(75) Inventors: Stewart R. Wyatt, Boise, ID (US); Robin Alexis Takasugi, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 773 days.

(21) Appl. No.: 10/091,738

(22) Filed: Mar. 6, 2002

(65) Prior Publication Data
US 2003/0172328 A1 Sep. 11, 2003

(51) Int. Cl.
*G06F 11/00* (2006.01)
(52) U.S. Cl. .................. 714/704; 714/769; 714/719
(58) Field of Classification Search ............. 714/704, 714/719, 769
See application file for complete search history.

(56) References Cited

U.S. PATENT DOCUMENTS 5,600,662 A * 2/1997 Zook ...................... 714/769
5,712,861 A * 1/1998 Inoue et al. ............. 714/752
5,751,733 A * 5/1998 Glover .................... 714/765

* cited by examiner

*Primary Examiner*—Guy J. Lamarre

(57) ABSTRACT

Methods and systems are provided for transferring data and for pausing the transfer of data when certain conditions are met. In one embodiment, an error correcting code (ECC) encoder/decoder reads a codeword from a data storage device and decodes the codeword. The ECC encoder/decoder corrects any correctable errors in the codeword and outputs information regarding the condition of the codeword, such as the number of detected full errors and the number of erasures. The number of full errors is compared with a full error threshold value. When erasures are available, the number of erasures can be compared with an erasure threshold value. Both threshold values may be set at levels below the maximum levels at which errors can still be corrected. When either of the threshold values are exceeded, the transfer of data is paused and a processor is interrupted so that further action may be taken.

25 Claims, 5 Drawing Sheets

PAUSING A TRANSFER OF DATA

FIELD OF THE INVENTION

The present invention is generally related to data storage and the retrieval of data from data storage devices. More particularly, the present invention is related to systems and methods for initiating an interrupt during a data transfer command.

BACKGROUND OF THE INVENTION

Data storage devices have been used for years to store binary data to be used in computer systems. In data storage devices, there are currently two main types of memory systems being used to store data. Some newer technologies, such as those which use SRAM (Static Random Access Memory), have been developed in an attempt to create a "perfect" memory system, i.e. a memory system in which the storage media is completely reliable. In the perfect memory system, all the data that is stored on the media would be recoverable. In other words, the data can be read off of the media without any errors. The perfect memory system does not require any provision to detect or recover from data corruption in the media.

In a second type of memory system, the memory system has been designed with an imperfect media, such as the magnetic media used in disk drives and tape drives. In this system, the media typically includes imperfections that cause errors in reading data from the media. Therefore, in this type of storage system, it is necessary to somehow accommodate for the errors by detecting and correcting them. Imperfect memory systems are often referred to as memory storage systems.

There is some trade-off between the perfect memory system and the memory storage system. Memory storage systems, using imperfect media, incur the overhead of a controller that implements error detection and correction circuitry. To implement an error detection and correction function, it is normally a requirement that data stored on the media be stored and retrieved as a sector or block (usually 512 bytes). Perfect memory systems do not have the additional cost of an error detection and correction controller. However, in spite of the additional overhead required by imperfect memory systems, the cost to store a given unit of data is dramatically cheaper in memory storage systems with imperfect media than in a perfect memory system.

During the normal evolution of the development of memory storage systems, the quality of the media has improved and the number of errors has been reduced as manufacturers have gained experience. In this environment, it is usually more cost effective to increase the density of the storage in the media such that the error rate remains unchanged.

In the memory storage system, a controller may control how imperfections can be detected and corrected in order to hide the imperfections from a user. The user will be able to safely store data into the storage system while the controller provides reliable retrieval of the stored data. The controller effectively deals with errors in the media such that retrieval of data will appear seamless to the user.

Media errors can be caused by a number of factors, including manufacturing defects, aging, and internal effects such as electrical noise and environmental conditions. In general, defects can be classified as either systematic errors or random errors. Systematic errors consistently affect the same location. Finding systematic errors is relatively easy because they are repeatable, wherein one Verify pass over the media will disclose them.

Random errors occur transiently and are not consistently repeatable. Therefore, random errors are much more difficult to detect because they may not show up in a test involving only one pass of the data.

There are basically two ways that errors in the media can be handled. One way that errors in the media can be handled is by error correction coding and decoding. Error correction coding (ECC) involves receiving original data and encoding the data with additional parity for storing on an imperfect medium. Each sector of data consists of one or more codewords, and, in the example in which the sectors contain 512 bytes, each sector may be divided into four units of 128 bytes. In the preferred implementation, the 128 bytes of original data are encoded with 32 parity bytes to create 160-byte codewords.

When the data needs to be retrieved, the encoded data is decoded allowing errors to be identified and ideally corrected. The data plus the parity is processed through a decoder, which checks the parity to detect errors. The decoder removes the parity bytes, corrects the errors, and returns the original block of data back to the host with the errors removed. The host normally will have no knowledge of the fact that errors have been detected and corrected.

A wide range of ECC schemes is available and can be employed alone or in combination. Suitable ECC schemes may include schemes with single-bit symbols (e.g., Bose-Chaudhuri-Hocquenghem (BCH)) and schemes with multiple-bit symbols (e.g., Reed-Solomon).

As general background information concerning ECC, reference is made to the following publications: W. W. Peterson and E. J. Weldon, Jr., "Error-Correcting Codes," $2^{nd}$ edition, $12^{th}$ printing, 1994, MIT Press, Cambridge, Mass. and "Reed-Solomon Codes and their Applications," Ed. S. B. Wicker and V. K. Bhargava, IEEE Press, New York, 1994.

One implementation uses the Reed-Solomon multi-bit symbol. Correcting a multiple-bit symbol typically includes a two-step process. In the first step the symbol in error is identified. In the second step the error pattern of the symbol is identified so that the errors can be corrected. Errors identified using ECC codes with multiple-bit symbols fall into two categories. The first category is called a "full" error where both steps are required to identify and correct the error. The second category is called an "erasure" error where a symbol in error has been identified by some other means and the ECC code only has to identify the error pattern within the symbol.

Two parity symbols are required to locate and correct a full error while only one parity symbol is required to correct an erasure error. While not all storage systems implementing an ECC are capable of detecting erasures, the ability to detect and correct erasures can substantially improve the capability of a given coding scheme.

Another way that errors can be handled is to identify errors in particular locations within the media and avoid these locations. This technique is known as sparing. When a defective block of data is identified, the controller will effectively work around the defective areas. When data cannot be stored in a defective location, the controller will find other available space on the media for storing the data. When a later request is made for the data that was intended to be stored in the defective location, the request is diverted to the alternative location for retrieval of the data.

During manufacturing, memory locations with errors can be detected and these locations can be avoided using a sparing technique. When a location is identified as containing an imperfection or if the location appears to be problematic in returning error-free data, this location is put on a list of defective locations known as a spare table. The spare table will include the defective locations so that any request made for data in those locations can be diverted to a specified alternative location where the data was stored.

Once the data is stored on the media, it is essential to a user of the memory product that the stored data is made available to the rest of the computer system, which will utilize the data for performing various functions. For instance, a computer system may use the data for instructions on how to operate a certain program. When the data cannot be read, then the data stored in the storage device typically is useless and the user loses confidence in continuing to use the device.

In order to check whether or not data can be read from a storage device, a Verify command can be used that works in conjunction with a Write command, which involves writing data to the storage media. While executing the Write command, data is encoded and stored on the media along with parity bytes. During the Verify command, the data is read back and decoded to ensure that it can be recovered. After decoding each codeword of data, the decoder reports if it was capable of recovering the data by detecting and correcting any errors in the data. After recovering the decoder status, the decoded data is discarded. If the Verify command determines that data can be read back correctly, then the Write command is considered to have been a success. If data cannot be read back, then the Verify command considers the Write command to have been unsuccessful and necessary measures are taken. This might include a second attempt to write the data or a decision to spare the locations and rewrite the data at a more reliable location. The Verify command may also provide a confirmation that the read/write system is operating properly.

Verify commands of the prior art have some limitations in certain test environments. The conventional Verify command stops the operation of other computer functions by initiating an interrupt every time the command is run for a specified length of addressable locations. Processing these interrupts wastes processor bandwidth and inevitably slows down other functions even when no errors are discovered during the verification. The processor becomes occupied with the interrupt each time the Verify command is run, thereby slowing down the execution of the test and other functions of the computer system.

Thus, a need exists in the industry to address the aforementioned and/or other deficiencies and inadequacies of the prior art.

SUMMARY OF THE INVENTION

An embodiment of a system of the present invention may include a first register for providing a full error threshold value and a second register for providing an erasure threshold value. An ECC encoder/decoder determines the number of full errors and erasures in a codeword being transferred. Comparators compare the number of detected full errors and erasures with the respective threshold values in the registers. If either of the thresholds is exceeded, then the data transfer is paused while an interrupt procedure is performed.

The present invention can also be viewed as providing methods for pausing the transfer of data. In this regard, one embodiment of such a method, among others, can be broadly summarized by the establishing of at least one threshold value, determining the number of at least one type of error, comparing the number of detected errors with the threshold values, and pausing the transfer of data when the number of detected errors exceeds the threshold values.

BRIEF DESCRIPTION OF THE DRAWINGS

Many aspects of the invention can be better understood with reference to the following drawings. Moreover, in the drawings, like reference numerals designate corresponding parts throughout the several views.

DETAILED DESCRIPTION

The present invention provides systems and methods for initiating an interrupt and pausing the transfer of data when certain numbers of errors have been detected in a codeword. After each codeword has been processed, an error correction coding (ECC) encoder/decoder outputs the status of the codeword, the status indicating several characteristics detected during the decoding of a codeword as part of a data transfer command, such as the number of full errors and erasures detected. In response to the status of the codeword, a comparison is made between the status and acceptable threshold values to determine if the codeword exceeds the threshold values. If at least one of the thresholds is exceeded, then the processor is interrupted in order to monitor the condition of the codeword and to take necessary action. During the interrupt, the processor may record the memory locations of errors and allow the command to continue, or it may spare defective locations, or it may request that the command be restarted.

Figure 1:
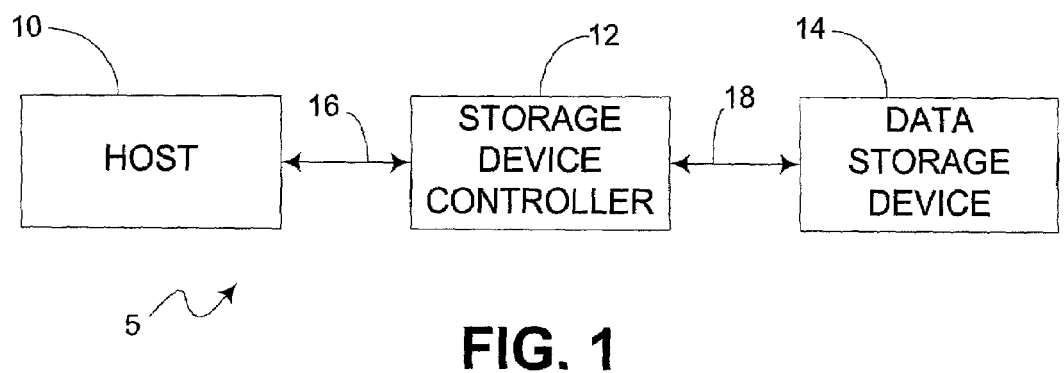
FIG. 1 is a block diagram illustrating an embodiment of a data storage system of the present invention.

Interrupt systems and methods of the present invention will now be explained in greater detail with reference to the drawings. In FIG. 1, an embodiment of a system 5 of the present invention includes a host 10, such as a personal computer or other computer system that relies upon access to memory. The host 10 may also be an external testing system used during manufacturing of a storage device. Alternatively, the host 10 may be an internal testing system within a storage device for executing self-tests and requesting the execution of a Verify procedure, such as the continuous verification procedure as described in co-pending U.S. patent application Ser. No. 10/192,111, which is hereby incorporated by reference in its entirety into the present disclosure. The host 10 interacts with a data storage device 14 via a storage device controller 12. The host 10 is connected to the storage device controller 12 along line 16. Line 16 may include any type of serial or parallel path for electrical communication between the host 10 and storage device controller 12.

The host 10 writes data along line 16 to the storage device controller 12. The host 10 may also read data from the storage device controller 12 when the stored data is requested by the host 10. The storage device controller 12 is also connected to the data storage device 14 along line 18, which may include any type of serial or parallel communication path.

When data from the host is to be written into memory, the storage device controller 12 encodes the data on line 16 from the host 10 and writes the encoded data onto line 18 to the data storage device 14. When data is read back from the data storage device 14 along line 18, the storage device controller 12 decodes the data and transmits the data to the host 10.

The data storage device 14 may be any type of memory device, for example a magnetoresistive random access memory (MRAM) device or other solid state device such as Flash, OVM, a ferro-electric device, a magnetic media storage device such as a tape or disk drive, or other suitable memory device. The data storage device 14 and the storage device controller 12 may be packaged together as a memory component having storage and control capacities. The memory component may be a memory card that may be removed from the computer system. Such removable memory components have been recently developed to provide a small, compact package, which can be easily carried and stored by a user. The memory component may be a type of storage unit that would be compatible with a Compact-Flash™ format. However, the storage unit may be of the type that is compatible with other formats, such as SecureDigital™ or MultiMediaCards™.

Figure 2:
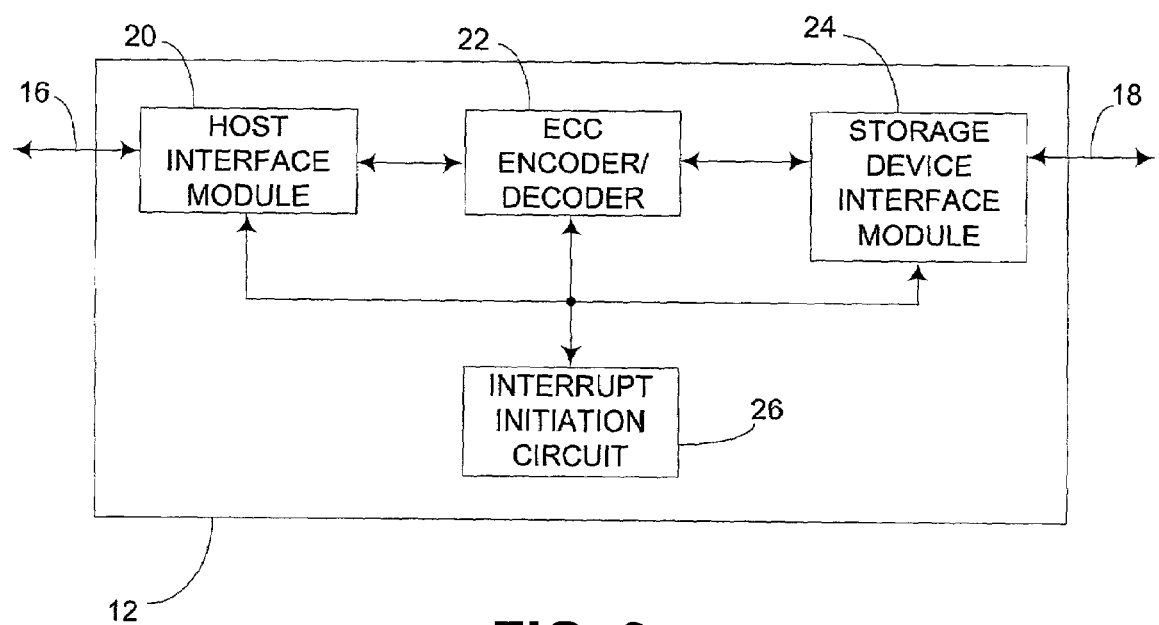
FIG. 2 is a block diagram illustrating details of an embodiment of the storage device controller shown in FIG. 1.

FIG. 2 illustrates another embodiment of the storage device controller 12, which may be configured in a variety of ways to perform the functions of the present invention. The data path, along which data is transferred, includes the host 10 on one end and the data storage device 14 on the other. Between the host 10 and data storage device 14 are a host interface module 20, an ECC encoder/decoder 22, and a storage device interface module 24.

Figure 3:
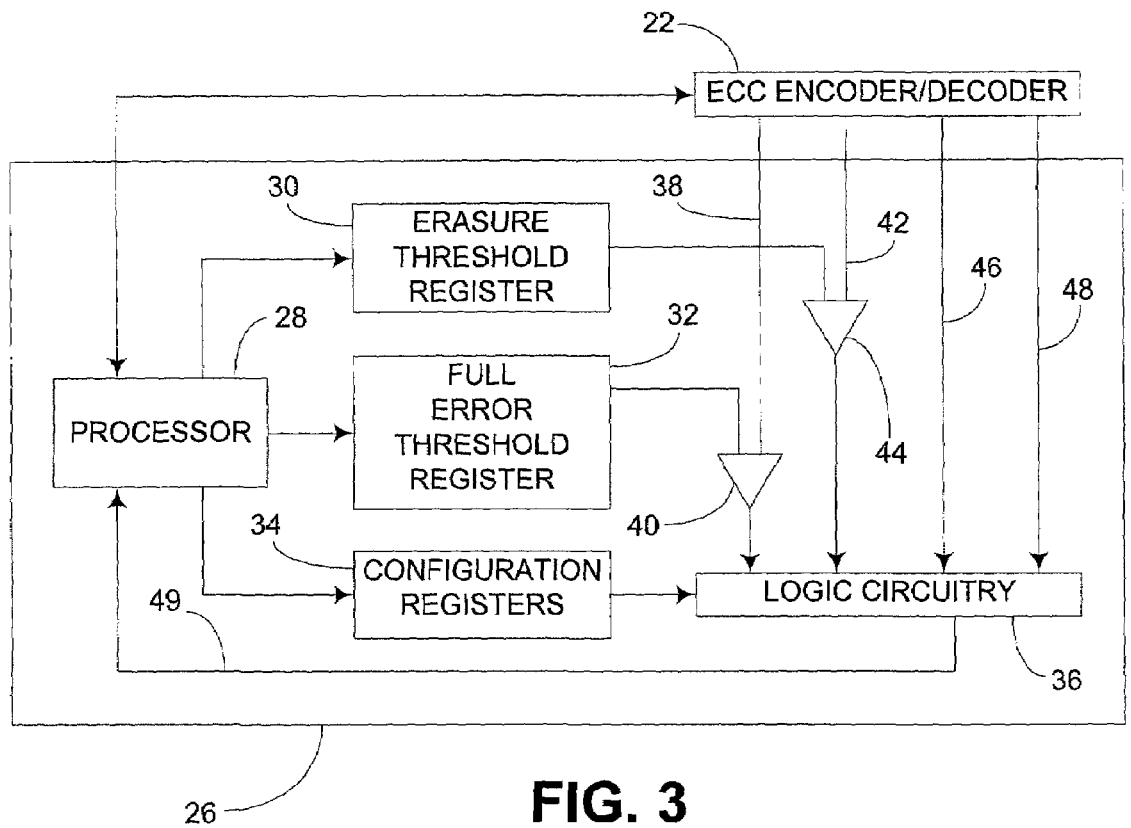
FIG. 3 is a block diagram illustrating details of an embodiment of the interrupt initiation circuit shown in FIG. 2.

The host 10 sends commands to the host interface module 20, which stores the commands in its registers. The arrival of a command triggers an interrupt of a processor 28 located in the interrupt initiation circuit 26, one embodiment of which is illustrated in FIG. 3. The processor 28 reads the registers in the host interface module 20 to recover the command. Then the processor 28 initiates a routine based on the type of command that was requested. The present invention generally applies to situations when a request for a Read command has been made or during a Verify command. However, the present invention may also apply to other situation when data is transferred between a data storage device and a host.

In FIG. 2, the components along the data path, i.e. the host interface module 20, ECC encoder/decoder 22, and storage device interface module 24, contain registers that temporarily store data. The status of the registers is transmitted to the interrupt initiation circuit 26 to determine when to interrupt the processor 28 so as to notify the processor 28 of certain conditions. When the errors of a given codeword reach a certain threshold, the transfer of data is paused and the interrupt is initiated. When the processor 28 is interrupted, it may then recover the status before it is lost. The storage device controller 12 can be customized such that it only interrupts the processor 28 when specific thresholds have been exceeded, thereby removing processor intervention in cases that are not of interest and increasing the efficiency of the system.

The ECC encoder/decoder 22 is coupled to the host 10 through the host interface module 20 such that it can receive data to be written to memory. The ECC encoder/decoder 22 encodes the data with parity and writes the encoded data to the data storage device 14 via storage device interface module 24.

When a request is made from the host 10 for data in the data storage device 14, data is transmitted along line 18 to the storage device interface module 24, which then transmits the data to the ECC encoder/decoder 22. The ECC encoder/decoder 22 decodes the data by removing parity stored along with the data, checks the data for errors, corrects the correctable errors and transmits the corrected data to the host 10 via host interface module 20.

The data storage device 14 may store the original data in blocks or sectors having a specific size, typically 512 bytes. The original data may be divided into four equally sized units of 128 bytes and encoded into 160-byte codewords. In this example, the 160 bytes of the codeword are made up of 128 data bytes and 32 parity bytes. Therefore, 80% of the data stored on the media is the original data and 20% of the data are parity bytes, which are an overhead required to support the ECC.

Typically, errors can be described in two classes. The first class of error is a systematic error. Systematic errors consistently affect a particular storage cell or group of cells. Typically, systematic errors are caused by manufacturing defects or aging. Systematic errors are repeatable and so are easily located.

A second type of error is a "soft" or random error. These errors are transient and are caused by internal effects and external environmental conditions. Locating these errors requires multiple passes over the media under varying environmental conditions and so are much harder to find.

In designing error correction code and circuitry, a decision is made as to the number of errors that are likely to be seen. This decision determines how many parity bytes should be added in order to correct the errors. The parity bytes add cost to the system by occupying storage space that is not available for storing the user's data. Therefore, it would make sense to minimize the parity bytes as much as possible. However, if the number of errors in a codeword is greater than what the system is capable of correcting, then the codeword will be uncorrectable and cannot be recovered. Even worse, the original data could be unknowingly corrupted. This is called an undetected error. By analyzing the number of full errors and erasures, the present invention may be used to optimize the number of parity bytes for a certain number of bytes of the entire codeword.

The ECC encoder/decoder 22 of the present invention outputs the number of errors and other results from the error detecting and correcting procedure. The ECC encoder/decoder 22 may send outputs that include an indication of a number of full errors detected, a number of erasures detected, whether any errors were detected, whether uncorrectable errors were detected, etc.

FIG. 3 provides an example of some of the possible outputs from the ECC encoder/decoder 22. The ECC encoder/decoder 22 outputs a signal along line 38 that indicates the number of full errors detected by the ECC encoder/decoder 22. A signal indicating the number of detected erasures is output along line 42. This implementation of the present invention refers to a system that is capable of detecting and correcting erasures. However, this invention may also be applied to systems that are only capable of correcting full errors. In this respect, the erasure output along line 42 would be ignored or the circuitry used for detecting erasures could be removed.

A "status" signal, output along line 46, may contain information indicating several characteristics of the error detecting and correcting procedure. The status signal may indicate whether any errors were detected, and more specifically whether any full errors or erasures were detected. The status signal may also indicate other characteristics of the codeword that the ECC encoder/decoder 22 may detect.

A "validity" signal is output along line 48 indicating if any uncorrectable errors were detected. If there were uncorrectable errors, in which the limits of the parity bytes were exceeded, then the information on lines 38, 42, and 46 may not be valid. If it has been determined that there are uncorrectable errors in the codeword, then the validity of the number of full errors and erasures will likely be questionable. If there are no uncorrectable errors, then the number of detected full errors and erasures is valid.

FIG. 3 also illustrates circuitry of an embodiment of the interrupt initiation circuit 26. The processor 28 may be provided to control the internal operations of the interrupt initiation circuit 26. In one embodiment, the processor 28 waits for a request for a Read command or a Verify command. The processor 28 may respond to the Verify procedure as described in U.S. patent application Ser. No. 10/092,111. Upon receipt of a request for one of these commands or procedures, the processor 28 programs the registers 30, 32, and 34 depending on the type of test or command that is desired.

Figure 4:
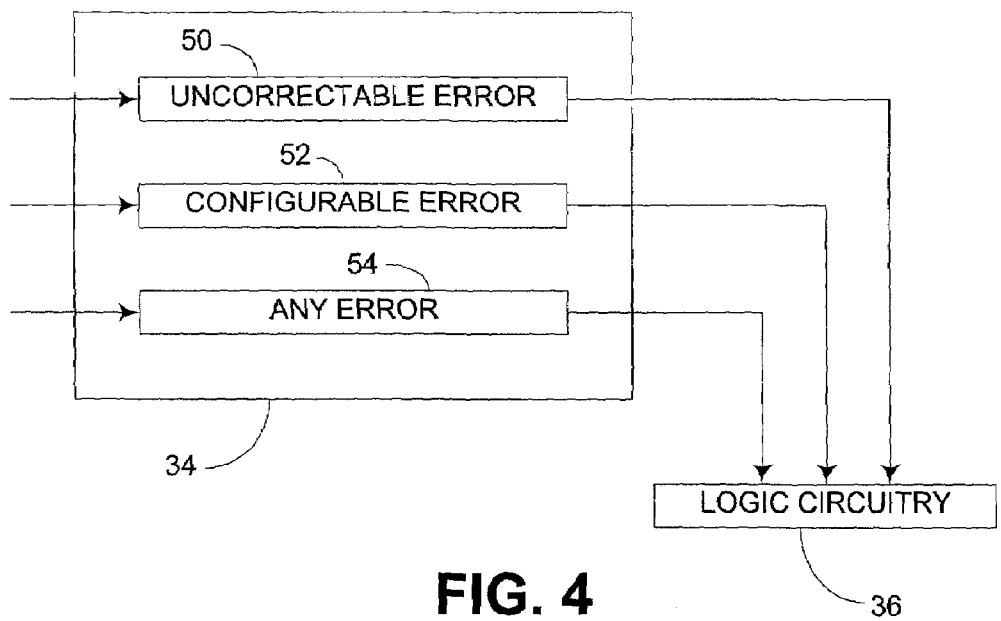
FIG. 4 is a block diagram illustrating details of embodiments of the configuration registers shown in FIG. 3.

One way that the processor 28 prepares the interrupt initiation circuit 26 to execute a requested command is by initializing one or more configuration registers 34. For instance, FIG. 4 shows three possible embodiments of configuration registers 34 that may be used to configure the logic circuitry 36 to respond to certain types of errors. More than one configuration register may be chosen at any time.

If the "uncorrectable error" register 50 is selected, the appropriate configuration in the logic circuitry 36 is made to respond to the detection of uncorrectable errors. The logic circuitry 36 may detect uncorrectable errors by observing the validity signal from line 48, which includes information about the existence of uncorrectable errors. If an uncorrectable error is determined, the logic circuitry 36 outputs a signal along line 49 notifying the processor 28 that it is time for an interrupt.

If the "any error" register 54 is selected, then the logic circuitry is configured to respond to any detected error. The logic circuitry 36 may observe the status signal on line 46 to determine if any error has been detected. Since line 46 carries the status signal, which includes an indication of whether any errors were detected by the ECC encoder/decoder 22, the logic circuitry may determine this knowledge of any error, and output a signal on line 49 to the processor 28 to initiate an interrupt.

If the "configurable error" register 52 is selected, the logic circuitry 36 will be configured to respond to situations involving any predetermined number of errors. The predetermined number of errors may be set at any level up to the limits of the error correcting code. The logic circuitry 36 may respond to a number of detected full errors and a number of detected erasures. By using this configuration, a marginal storage location can be detected and spared before the codeword stored in that location becomes uncorrectable. This configuration can be used to provide a given level of margin to a design by locating and removing locations that are above a given error threshold.

Several embodiments may be used to respond to a detected number of full errors and erasures. The embodiment shown in FIG. 3 involves the use of a comparator 40, which compares the number of full errors detected by the ECC encoder/decoder 22 with a threshold value. Also, a comparator 44 compares the number of detected erasures with another threshold value. Other embodiments may be used to perform the functions of the present invention, responding to situations when it may be desirable to count the number of full errors and erasures and compare these numbers with predetermined threshold values. For instance, overflow counters (not shown) may signal an overflow condition wherein a certain number of errors is above a certain threshold. Other means for counting and comparing will be apparent to persons having ordinary skill in the art.

When the processor 28 initializes the "configurable error" register 52, the processor 28 may also set threshold values in an erasure threshold register 30 and in a full error threshold register 32. Alternatively, the threshold registers 30 and 32 may contain reference thresholds which are permanently set at a desirable level. If registers 30 and 32 contain permanent threshold values, then it is not necessary to include a connection between the processor 28 and registers 30 and 32 since the registers would not, in this case, depend upon signals from the processor 28. In another alternative, the erasure threshold register 30 and full error threshold register 32 can receive input values from a source other than the processor 28, such as from a tester input device (not shown). By using a tester input device, such as a keyboard or keypad, it is possible for a person testing certain types of media to directly alter the values in the threshold registers based on particular testing criteria.

In the embodiment shown in FIG. 3, the processor 28 programs the erasure threshold register 30 and full error threshold register 32 by setting a predetermined error limit within the threshold registers 30 and 32. The predetermined error limit may be set to any number up to a maximum number of errors that the ECC encoder/decoder 22 is capable of correcting. The values selected for each register may be selected based on predetermined standards determined by a manufacturer. The values may also be selected based on previous tests of the media.

In the example in which the codeword is 160 bytes long, and 128 bytes of the codeword are data bytes and 32 are parity bytes, it is possible to detect and correct up to 32 erasures and up to 16 full errors. Therefore, in this example, the erasure threshold register 30 may be set anywhere from 1 to 32 and the full error threshold register 32 may be set anywhere from 1 to 16. To be able to recover a corrupted codeword, the total number of erasure errors divided by two, plus the total number of full errors, must be sixteen or less. The threshold settings are selected to reflect this limitation. Preferably, the thresholds are set at a level so as to indicate that the number of detected errors in the codeword are getting close to the maximum capacity of the ECC encoder/decoder 22. Therefore, it is possible to spare the location before the point is reached at which the data becomes uncorrectable.

The logic circuitry 36 observes the outputs from the comparators 40 and 44. When the number of full errors on line 38 exceeds the value in the full error threshold register 32, the comparator 40 outputs a signal indicating this condition. When the number of erasures on line 42 exceeds the value in the erasure threshold register 30, the comparator 44 outputs a signal indicating that the erasure limit has been exceeded. In response to either one or both of the signals from the comparators 40 and 44 indicating the exceeding of thresholds, the logic circuitry 36 signals the processor 28 to initiate an interrupt.

After setting the configuration registers 34 and the threshold registers 30 and 32, the processor 28 then sends a start signal to the ECC encoder/decoder 22 to start the requested command, i.e. the Read command. In response to the start signal, the ECC encoder/decoder 22 decodes a first requested codeword, removes parity from the codeword, and checks for errors. As the ECC encoder/decoder 22 checks for errors, it corrects the errors that it is capable of correcting and outputs statistical information on the condition of the codeword.

The logic circuitry 36 inputs the signals from the ECC encoder/decoder 22 and comparators 40 and 44 to analyze the conditions of the codeword being tested. If the condition of the detected codeword reaches the condition or conditions as set by the configuration registers 34, the logic circuitry determines that these conditions have been met and initiates an interrupt of the processor 28, which suspends the transfer of data in order to interrogate the data in the registers of the ECC encoder/decoder 22 and interface modules 20 and 24.

The logic circuitry 36 initiates an interrupt and stops the data transfer on the next sector boundary after detecting a failing codeword. The interrupt alerts the processor 28 that the error has occurred. While the transfer of data is halted, the processor interrogates the contents of the registers in the ECC encoder/decoder 22 and interface modules 20 and 24. The response of the processor 28 depends on the condition of the codeword that prompted the logic circuitry 36 to initiate an interrupt. For instance, it may be necessary to spare memory locations. In some cases, it may be sufficient to merely record the location of errors and restart or continue the interrupted command.

The present invention automates the transfer of data to improve performance by minimizing the involvement of the processor 28 in moving data. In such a system, the processor 28 responds to a host command by initializing the register hardware, starting the transfer, and waiting for an interrupt to signal that the operation has completed or failed due to an error or errors.

In alternative and simpler systems, where performance is not a requirement, a processor with suitable I/O connections and memory can implement the entire controller ASIC. In such systems, the processor replaces the ECC encoder/decoder and performs all the functions of the ECC encoder/decoder 22. In a Read operation with this system, the processor uses I/O lines to implement the protocol to communicate with the data storage device to store data in memory and use an algorithm to detect and correct errors. Then, the processor uses the other I/O lines to implement the protocol to communicate with the host 10 and send the data out. After correcting a codeword using a firmware algorithm, the firmware compares the number of errors detected with a threshold value stored in the processor's memory space. If the threshold is exceeded, the firmware branches to an error servicing routine that performs the same functionality as the interrupt routines described for the hardware solution. However, this type of system requires the constant involvement of the processor, which slows down the operation of the test.

In order to maximize performance and to increase the speed of the operation requested by the host 10, the present invention minimizes the involvement of the processor 28 by taking the processor 28 out of the data path. Therefore, the role of the processor 28 is to accept commands from the host interface module 20, configure the registers 30, 32, and 34, and respond to interrupts from the logic circuitry 36 along line 49. Since the actual data transfer operation does not involve the processor 28 but is instead automated by hardware configured in the ECC encoder/decoder 22, the Read and Verify commands run more quickly.

The host interface module 20 interrupts the processor 28 to indicate that a command has been received from the host 10 to prompt the processor 28 to perform any of a number of possible functions, i.e. writing, reading, conventional verifying, or the verifying as described in application Ser. No. 10/092,111. The host 10 maybe a manufacturing test system or a host capable of executing self-tests or diagnostics requesting that the device execute a Verify procedure of the present invention. The configuration registers 30, 32, and 34 are programmed by the processor 28 in response to a command received from the host 10. The configuration registers 34 control the hardware in the logic circuitry 36 to respond to certain types of errors.

Figure 5:
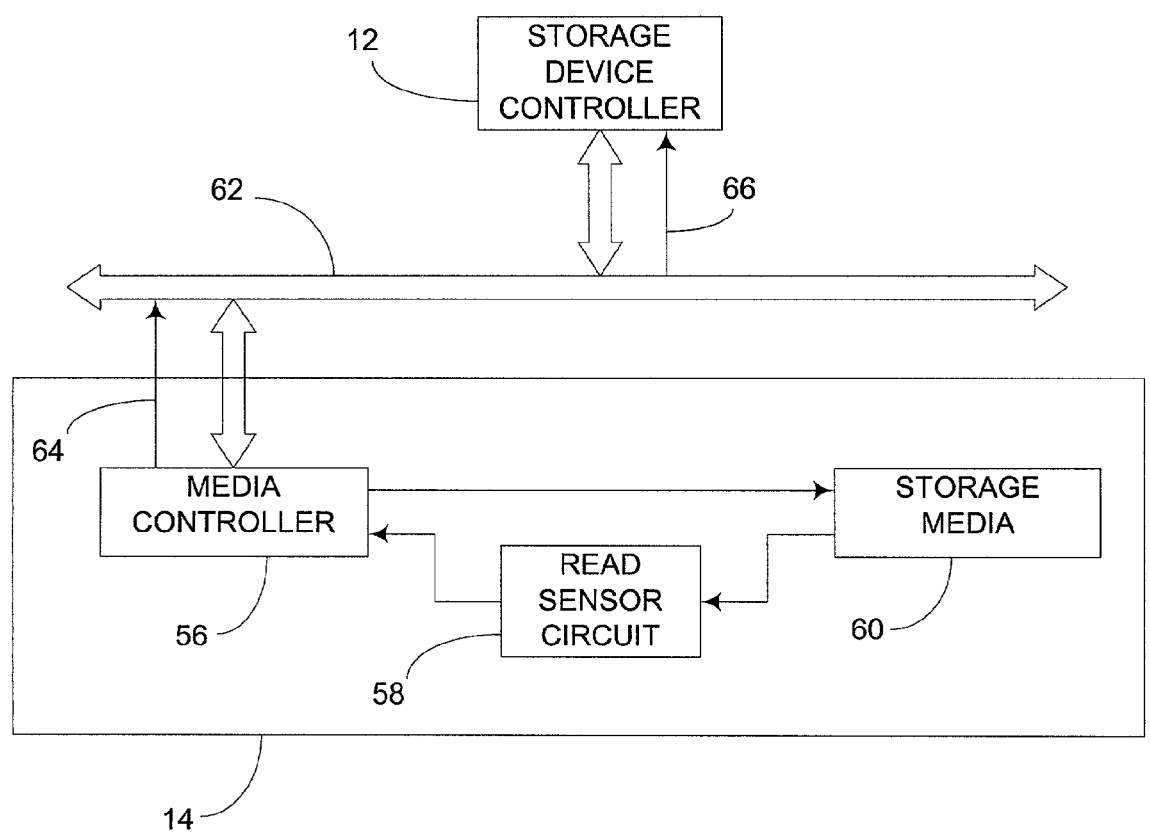
FIG. 5 is a block diagram illustrating details of an embodiment of the data storage device shown in FIG. 1.

FIG. 5 shows an embodiment of the data storage device 14 and connections to the storage device controller 12. The data storage device 14 shown in FIG. 5 is capable of alerting the storage device controller 12 that the codeword being read out contains an erasure error. The data storage device 14 may be designed to indicate erasures to the storage device controller 12. As shown in FIG. 5, the data storage device 14 contains a media controller 56, which controls the data coming in and going out of the data storage device 14. The media controller 56 also controls how the data is written into the storage media 60, which contains the physical structure capable of storing data in specific address locations. The media controller 56 controls the writing of data to the designated address locations.

When data is read from the storage media 60, the data is transmitted through a read sensor circuit 58. The read sensor circuit 58 measures parametric data, such as a resistance value, associated with the read operation. If an out-of-bounds condition is detected, most likely caused by a media defect, then an indication is made that the data is suspect. The media controller 56 outputs along line 64 an erasure signal indicative of suspect data. The erasure signal is output to bus 62 in conjunction with the output of the data byte. The storage device controller 12 receives the data byte from bus 62 and also checks to see if an erasure signal has been sent along with the data symbol. The storage device controller 12 receives the erasure signal, if present, along line 66. Thus, the storage device controller 12 knows from the offset that the received data byte is likely to contain an error. In such a case, it is not necessary to use the code of the ECC encoder/decoder 22 to detect whether an error exists in the data symbol. Other systems may be used to alert the storage device controller 12 of erasures in situations where the data being transferred is suspected of containing an error or errors.

Figure 6:
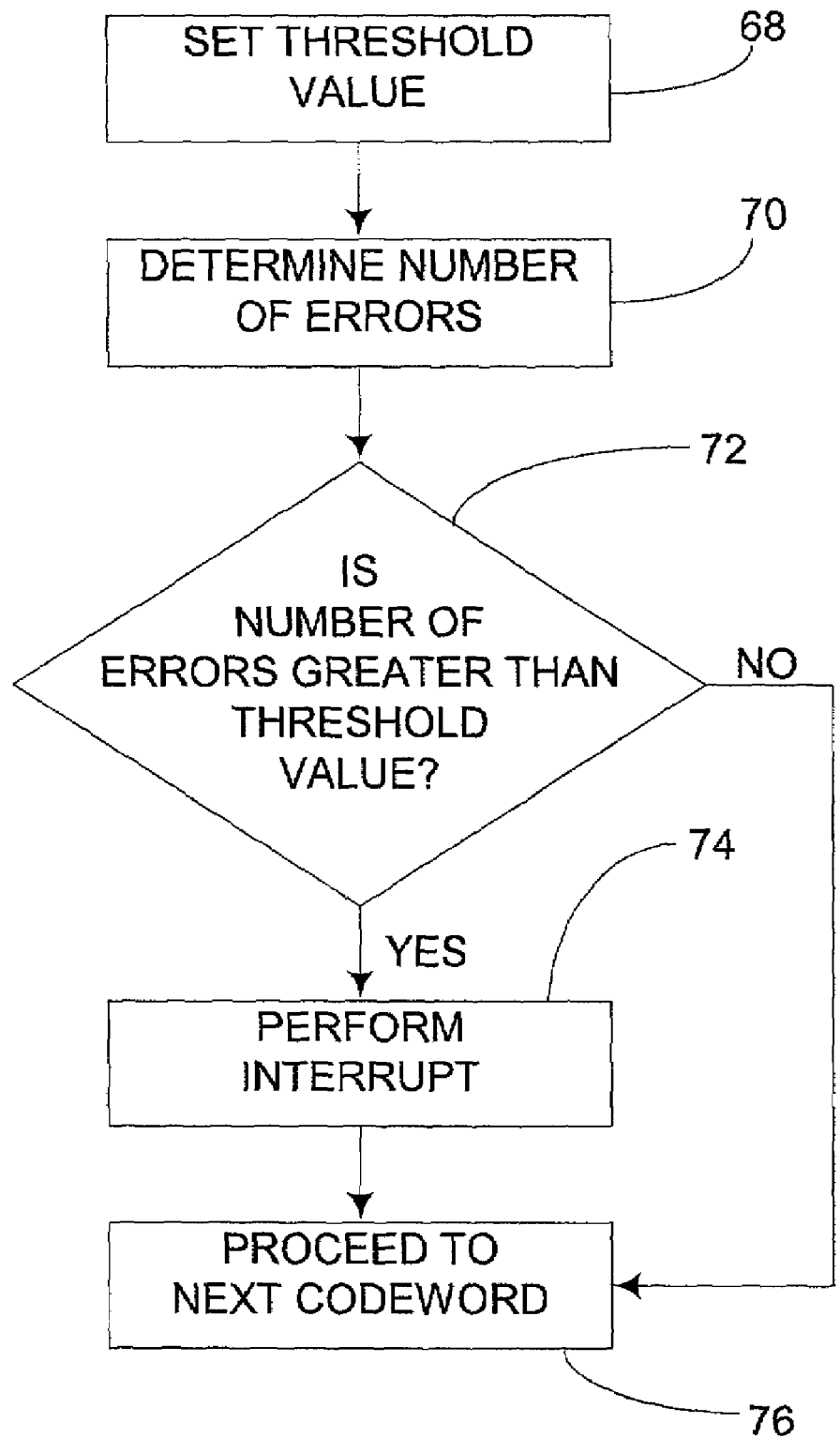
FIG. 6 is a flow chart illustrating functionality of an embodiment of the system of FIG. 1.

FIG. 6 is a flow chart illustrating an embodiment of a method for performing the interrupt routine. Beginning with block 68, a threshold value is set. This step may include either the setting of a full error threshold value in the full error threshold register 32, the setting of an erasure threshold value in the erasure threshold register 30, or both.

The number of errors is then detected by the ECC encoder/decoder 22, as indicated in block 70. This step may include either detecting full errors or detecting erasures. It is then determined whether or not the number of detected errors is greater than the threshold value (block 72). This determination may include comparing the number of detected full errors with the full error threshold value or comparing the number of detected erasures with the erasure threshold value. If the threshold value is exceeded, then an interrupt routine is initiated (block 74) and the routine is repeated for the next codeword under test (block 76).

Figure 7:
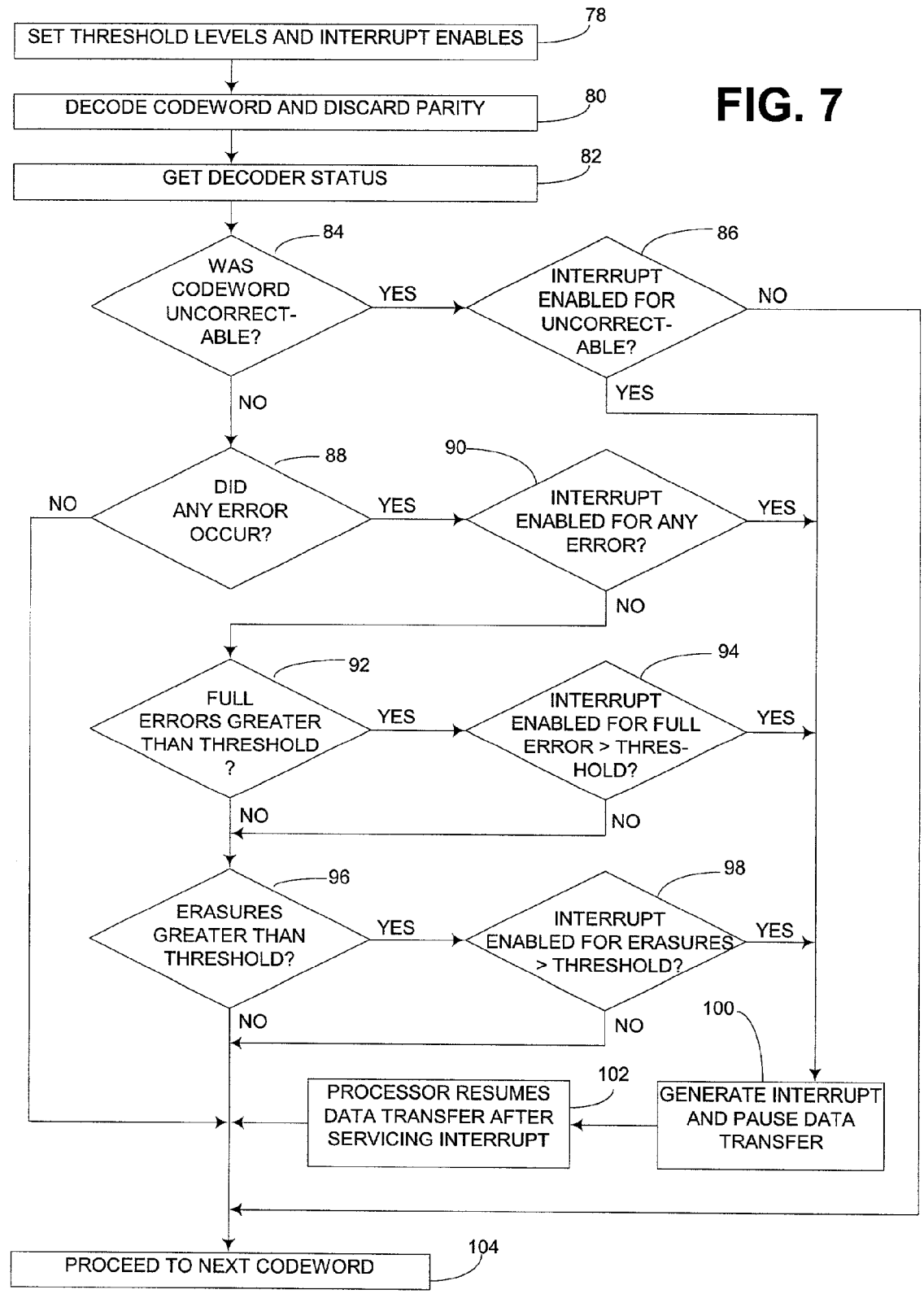
FIG. 7 is a flow chart illustrating functionality of another embodiment of the system of FIG. 1.

FIG. 7 shows a flow chart that illustrates a more detailed method for performing an interrupt procedure. The first step, as indicated in block 78, includes setting the threshold levels in the erasure threshold register 30 and full error threshold register 32. The setting of threshold levels may be carried out by the processor 28 in response to a request from the host 10. The processor 28 may also enable the various interrupts by selecting one or more of the configuration registers 34, which configure the logic circuitry 36 by enabling the logic circuitry 36 to respond to the selected interrupts. Then the processor 28 sends a start signal to the ECC encoder/decoder 22 to begin the error checking and correcting routine. The ECC encoder/decoder 22 decodes the codeword and removes parity (block 80), and checks for errors and outputs the status of the codeword along lines 38, 42, 46, and 48 (block 82).

By analyzing the output status of the ECC encoder/decoder 22, the logic circuitry 36 performs the step indicated in block 84 by determining whether the codeword was uncorrectable by observing the output along line 48. If the codeword was determined to be uncorrectable, the method proceeds to block 86, where it is determined whether or not the "uncorrectable error" register 50 has been selected to enable the logic circuitry to respond to such an error. If the logic circuitry 36 is enabled to respond to uncorrectable errors, then the method proceeds to block 100, where an interrupt is generated and the data transfer is paused. If the logic circuitry 36 is not enabled, then the method proceeds to the next codeword (block 104). If an uncorrectable error is detected, it is not necessary to check for "any error" or the number of full errors or erasures because the detection of an uncorrectable error indicates not only that the thresholds set in the threshold registers 30 and 32 have been exceeded, but also that the decoder's ability to correct errors has been exceeded.

If the codeword was determined not to contain an uncorrectable error in the step indicated in block 84, then the method proceeds to block 88, where a determination is made whether any error has occurred. The logic circuitry 36 may observe the output along 46 to determine if there was any error. Alternatively, the thresholds in the erasure threshold register 30 and full error threshold register 32 may be set such that the output of the comparators 40 and 44 indicate when any error has occurred. In this alternative embodiment, an indication by the ECC encoder/decoder 22 that "any error" has occurred would not be necessary. Other variations of circuitry can be used to accomplish the same results as would be obvious to persons having ordinary skill in the art.

If no error occurred (block 88), exceeding of thresholds is not a concern and the system proceeds to the next codeword (block 104). If an error has occurred, and if the "any error" interrupt has been enabled by the any error configuration register 54 (block 90), then the interrupt is generated and the data transfer paused (block 100). If the any error interrupt is not enabled, then the method continues in order to determine the number of full errors and erasures.

At this point, it does not matter which type of error is detected first. As indicated in FIG. 7, the number of full errors can be determined first (block 92). However, it is to be understood that erasures may be determined first instead. In step 92, the number of full errors, output from the ECC encoder/decoder 22 along line 38, is compared by the comparator 40 with the threshold value from the full error threshold register 32 to find out if the threshold has been exceeded. If the threshold has been exceeded, it is determined whether the "configurable error" interrupt has been enabled for full errors (block 94). If so, then the interrupt is generated. If not, the method proceeds to the determination of the number of erasures.

In block 96, it is determined whether the number of erasures has exceeded its threshold by observing the output from the comparator 44, which compares the number of erasures from line 42 with the threshold value from erasure threshold register 30. If the number of erasures is greater than the threshold, it is then determined whether the erasure interrupt has been enabled (block 98). If the number of erasures is greater than the erasure threshold value and if the erasure interrupt has been enabled by the "configurable error" configuration register 52, then an interrupt is generated (block 100). If the configurable error configuration register 52 has not been selected in step 98, then the method proceeds to the next codeword (block 104).

It is possible that the "any error" configuration register 54 and any circuitry in the ECC encoder/decoder 22 which is used for outputting an indication of "any error" along line 46 can be eliminated. If the condition of "any error" is needed, the erasure and full error thresholds could be set at one, so that an interrupt could be processed when only one error is detected, which will have the same results as using the "any error" circuitry.

If any of the conditions concerning the number or type of errors have been met, and if the corresponding interrupts have been enabled, then the interrupt is processed (block 100) as described above and the data transfer is paused so that the registers of the ECC encoder/decoder 22 and interface modules 20 and 24 can be interrogated. After the interrupt has been serviced (block 102), the processor resumes the data transfer, and the method continues for the next codeword until no more codewords are to be transferred.

It is to be appreciated that the determination of the specific error conditions can be performed after the determination of whether the interrupt has been enabled, if desired. For example, the steps of blocks 84, 88, 92, and 96 can be switched with the steps of blocks 86, 90, 94, and 98, respectively.

Different interrupts may be enabled based on the type of tests that are desired and the time when these tests are to be performed. For instance, in a product shipped to a user, interrupts for uncorrectable errors would normally be enabled, but the "any error" interrupt would likely never be set. The "configurable error" interrupt would be useful to a user at the times when the data develops errors to a point at which acceptable thresholds are exceeded. At such a time, the data may require sparing or some other action. However, in a development environment, it would be desirable to allow the flexibility of turning any number of the interrupts off or on depending on different types of tests to be performed.

The method described herein may be used to detect the quality of the media in a manufacturing environment. For instance, new types of media can be evaluated by determining if the media meets the standards set by the thresholds in the registers 30 and 32. Through this process, it is possible to evaluate and compare different types of media to determine which types perform better in terms of errors.

In addition to use in the manufacturing context, the present invention may also be used to create a spare table during the writing of data on the storage media. When certain locations consistently show errors, these locations may be spared. Sparing can be performed before a user ever tries to use the defective locations.

The system described herein may also be used for determining the quality of a storage media based on set standards. By providing graduated standards, a scaled determination of the quality of the media can be made. A score can be applied to a certain media that meets one of many possible standards. For example, the threshold levels of registers 30 and 32 may be set relatively low to find the highest quality devices. Or the registers 30 and 32 may be set relatively high to detect lower quality devices.

The system described herein may also be used to periodically test media that deteriorates over time. After manufacturing of certain types of memory products, the media may begin wearing down as a result of age or environmental conditions, which may negatively influence the media. By periodic checking of the media over time, memory locations that develop flaws may be spared. Even after a user has purchased the memory product, additional memory locations may be added to the spare table.

The system described herein may also be used to optimize the error correcting code used for certain types of media as the quality of the media improves or as the media manufacturing process matures. If it is determined that a certain type of media shows acceptable margin over a long period of time without coming close to the number of errors which the code is capable of detecting and correcting, then it may be determined that a smaller code can be chosen with fewer parity bytes. A new code may be selected that does not require as much overhead for parity, thereby allowing more room on the media for user data.

The ECC encoder/decoder 22 may contain counters to count the number of errors detected during the checking of each codeword. One counter could be used to detect the total number of errors. Another counter could be used to detect the number of full errors. Still another counter could be used to count the number of erasures. Alternatively, counters could be located in the storage device controller 12 and could be triggered by signals from the ECC encoder/decoder 22.

Also, in cooperation with co-pending application Ser. No. 10/092,111, counters can be used to figure out how often an error is detected in a defective location. Often times in memory devices, errors may not show up on every pass, but only occasionally. A benefit of using this type of counter in the Verify procedure of the co-pending application Ser No. 10/092,111 is to detect the memory locations that do not reveal "soft" or random errors that are not consistently repeatable.

Another counter can be used to determine how much of the media has been checked before an error has been detected. Such a counter could be used to determine the quality of the media.

Still other counters could be used over a long period of time during periodic verification procedures to detect degradation problems in the storage media. By running a Verify procedure periodically during the course of a certain length of time, deterioration of the media over time can be detected.

Other counters can be used in a development environment to determine whether one media has better success in recovering data than another media. By counting errors of one media over several passes through the data, the results can be compared with the results of another media. The comparison may be performed by the processor 28 using results stored in its internal memory.

As will be appreciated by persons having ordinary skill in the art, other counters can be used for gathering useful data relevant to detecting and correcting of errors in the data storage media. The counters can, optionally, be used in conjunction with other statistical gathering devices for collecting, analyzing, and processing statistics on various types of media.

Memory in the processor 28 may also store reference values that indicate the minimum quality standards of a media under test. In such a case, the processor 28 can alter the threshold values in the threshold registers 30 and 32 to test the media against different quality standards. The processor 28 could compare the reference values with the results of the media under test to determine if the media meets certain standards.

The memory in the processor 28 can also be used to store data on the data storage device 14 for use by other processing devices. Also, the memory may store a spare table including a list of all the locations within the storage media that contain unrecoverable errors. The memory in processor 28 could then also store the alternative memory locations so that any reference to a particular address location containing an unrecoverable error will be diverted to the alternative memory location. The memory may also be used to store program steps for instructing the processor 28 how to perform the interrupt procedure of the present invention.

The interrupt procedure of the present invention may be implemented in hardware, software, firmware, or a combination thereof. In the preferred embodiment(s), the interrupt procedure may be implemented in software or firmware that is stored in memory and that is executed by a suitable instruction execution system using, for instance, processor 28. If implemented in hardware, as in an alternative embodiment, the interrupt procedure can be implemented with any of a combination of the following technologies, which are all well known in the art: discrete logic circuits having logic gates for implementing logic functions upon data signals, application specific integrated circuits (ASICs) having appropriate combinational logic gates, programmable gate arrays (PGAs), field programmable gate array (FPGAs), etc.

The flow chart of FIG. 6 shows the architecture, functionality, and operation of a possible implementation of the software. In this regard, each block represents a module, segment, or portion of code, which comprises one or more executable instructions for implementing the specified logical function(s). It should also be noted that in some alternative implementations, the functions noted in the blocks may occur out of the order shown in FIG. 6. For example, the steps 78 and 80 may occur before steps 82 and 84 (as shown), or the determining of erasures might occur before the determining of full errors, or they may in fact be executed substantially concurrently, depending upon the functionality involved, as will be obvious to one of ordinary skill in the art.

The interrupt procedure of the present invention, which may comprise an ordered listing of executable instructions for implementing logical functions, may be embodied in any computer-readable medium for use by or in connection with an instruction execution system, apparatus, or device, such as a computer-based system, processor-containing system, or other system that can retrieve the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In the present invention, sparing techniques can also be used even after manufacturing. For instance, the storage device controller 12 may add new defective memory locations to a spare table when the storage media 60 of the data storage device 14 degrades over time. A spare table, containing a list of defective memory address locations and a list of alternative address locations, may be stored in memory located in the processor 28 or other memory device. Therefore, the user's data will not be lost when the media wears out after an extended time.

Errors detected over time can be an indication that the media is defective. A comparison among other types of media can be made to discover what type of media holds up better over time.

Also, detected errors may be the result of harsh environmental conditions such as extreme temperatures or a humid environment. Therefore, this invention is capable of providing information about how the media stands up to these or other harsh conditions.

Also, the controller may also indicate how a particular storage media reacts to other external conditions that may cause damage to a storage device. Shock from a storage device being dropped on a hard surface may cause damage that can be detected by continuous error checking.

The present invention provides a more efficient scheme for testing media by reducing overhead, by allowing precise thresholds to be set for pausing the transfer and requesting processor intervention. The processor of the present invention is only involved in an error when the error exceeds the defined threshold.

It should be emphasized that the above-described embodiments of the present invention, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

We claim:

1. A method for pausing a transfer of data during a Verify command, the method comprising:
    selecting at least one threshold value that is below a maximum number of errors beyond which the errors are uncorrectable;
    determining a number of errors detected in the data being transferred during the Verify command;
    comparing the number of errors with the at least one threshold value; and
    pausing the transfer of data during the Verify command if the number of errors exceeds the at least one threshold value.

2. The method of claim 1, wherein selecting at least one threshold value comprises establishing a full error threshold value that designates a maximum number of allowable full errors in a codeword of the data being transferred and an erasure threshold value that designates a maximum number of allowable erasures in said codeword.

3. The method of claim 2, wherein determining the number of errors comprises determining the number of full errors and erasures in the codeword.

4. The method of claim 3, wherein comparing comprises:
    comparing the number of full errors with the full error threshold value; and
    comparing the number of erasures with the erasure threshold value.

5. The method of claim 2, wherein the full error threshold value and the erasure threshold value are established at levels below maximum levels at which an ECC decoder is capable of detecting and correcting errors.

6. The method of claim 1, wherein pausing the transfer of data comprises preserving the state of the data at the time of the pausing.

7. The method of claim 1, wherein selecting at least one threshold value comprises setting at least one level at which the errors in said codeword are recoverable.

8. The method of claim 7, further comprising sparing the locations that contain recoverable errors.

9. The method of claim 1, wherein determining a number of errors comprises determining the number of errors detected in data being transferred from a memory card.

10. The method of claim 1, wherein pausing the transfer of data only occurs when the number of errors exceeds the at least one threshold value.

11. A system for pausing a transfer of data during a Verify command, the system comprising:
    means for providing a full error threshold value that is below a maximum number of errors beyond which the errors are uncorrectable;
    means for determining the number of full errors in data being transferred from a data storage means during the Verify command;
    means for comparing said number of full errors with said full error threshold value; and
    means for pausing the transfer of data during the Verify command if said number of full errors exceeds said full error threshold value.

12. The system of claim 11, further comprising means for determining the number of erasures in said data being transferred from said data storage means.

13. The system of claim 12, further comprising means for comparing said number of erasures with an erasure threshold value.

14. The system of claim 13, wherein said means for pausing comprise means for pausing said transfer of data when said number of erasures exceeds said erasure threshold value.

15. The system of claim 11, wherein said means for determining is configured in hardware and a data path along which the data is transferred contains no processor.

16. The system of claim 11, wherein the data is transferred as part of a read command.

17. The system of claim 11, wherein the data is transferred as part of a Verify command.

18. The system of claim 11, wherein the means for determining a number of errors comprises means for determining the number of errors detected in data being transferred from a memory card.

19. A data-pausing system stored on a computer-readable medium used in conjunction with a computing device, the system comprising:
    logic configured to establish a full error threshold value and an erasure threshold value;
    logic configured to determine the number of full errors and the number of erasures in a codeword transferred from a data storage device to a host requesting one of a read command and a verify command;

logic configured to compare said number of full errors with said full error threshold value;

logic configured to compare said number of erasures with said erasure threshold value;

logic configured to pause the transfer of data if said number of full errors or erasures exceeds said full error threshold value or said erasure threshold value, respectively.

20. The computer system of claim 19, further comprising logic configured to interrogate registers which contain the data during the pausing of the transfer of data.

21. The system of claim 19, wherein the logic configured to pause the transfer of data comprises logic configured to only pause the transfer of data if said number of full errors or erasures exceeds said full error threshold value or said erasure threshold value, respectively.

22. A circuit for detecting errors in data and determining when to pause a transfer of the data and initiate an interrupt routine, the circuit comprising:

an error correcting code (ECC) encoder/decoder configured to detect and correct errors in a codeword being transferred;

a storage device interface in communication with said ECC encoder/decoder and a data storage device, said data storage device configured to store said codeword that is transferred to said host in response to said request; and an interrupt initiation circuit in communication with said ECC encoder/decoder, the interrupt initiation circuit comprising:

a processor;

an erasure threshold register configured to store a first threshold value;

a full error threshold register configured to store a second threshold value; and a first comparator configured to compare said first threshold value with a number of erasures detected by said ECC encoder/decoder, said first comparator further configured to output an erasure indication that indicates whether or not said number of erasures exceeds said first threshold value.

23. The circuit of claim 22, wherein said first threshold value is established by said processor.

24. The circuit of claim 22, wherein the interrupt initiation circuit further comprises:

a second comparator configured to compare said second threshold value with a number of full errors detected by said ECC encoder/decoder, said second comparator further configured to output a full error indication that indicates whether or not said number of full errors exceeds said second threshold value; and logic circuitry configured to receive said erasure indication, said full error indication, and a status indication from said ECC encoder/decoder, said logic circuitry being further configured to process the received indications in response to a configuration request from a configuration register, said logic circuitry being further configured to initiate an interrupt of the processor that pauses the data transfer when the received indications meet criteria set by said configuration request.

25. A method for determining when to pause the transfer of data, the method comprising:

establishing a full error threshold value;

establishing an erasure threshold value;

decoding a codeword being transferred from a data storage device;

indicating whether the codeword contains any errors;

determining the number of full errors;

determining whether the number of full errors exceeds the full error threshold value;

interrupting a processor and pausing the transfer of data if the number of full errors exceeds the full error threshold value;

determining the number of erasures;

determining whether the number of erasures exceeds the erasure threshold value;

interrupting the processor and pausing the transfer of data if the number of erasures exceeds the erasure threshold value.

* * * * *